(12) United States Patent
Abe (10) Patent No.: US 10,199,679 B2
(45) Date of Patent: Feb. 5, 2019

(54) BATTERY PROTECTION INTEGRATED CIRCUIT, BATTERY PROTECTION APPARATUS AND BATTERY PACK

(71) Applicant: Shuhei Abe, Tokyo (JP)

(72) Inventor: Shuhei Abe, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 188 days.

(21) Appl. No.: 15/140,800

(22) Filed: Apr. 28, 2016

(65) Prior Publication Data

US 2016/0344205 A1 Nov. 24, 2016

(30) Foreign Application Priority Data

May 21, 2015 (JP) .................................. 2015-103984

(51) Int. Cl.
*H02J 7/00* (2006.01)
*H01M 10/0525* (2010.01)
*H01M 10/42* (2006.01)

(52) U.S. Cl.
CPC ..... *H01M 10/0525* (2013.01); *H01M 10/425* (2013.01); *H01M 10/4257* (2013.01); *H02J 7/0031* (2013.01); *H01M 2010/4271* (2013.01); *H01M 2010/4278* (2013.01); *H01M 2220/30* (2013.01); *H02J 2007/004* (2013.01); *H02J 2007/0037* (2013.01); *H02J 2007/0039* (2013.01)

(58) Field of Classification Search
USPC ....................................................... 320/112
See application file for complete search history.

(56) References Cited

U.S. PATENT DOCUMENTS

| | | | | |
|---|---|---|---|---|
| 6,992,463 B2 * | 1/2006 | Yoshio | .................. | H02J 7/0031 |
| | | | | 320/134 |
| 7,701,176 B2 * | 4/2010 | Chen | ..................... | H02J 7/0031 |
| | | | | 320/134 |
| 2012/0313574 A1 | 12/2012 | Maetani et al. | | |
| 2013/0227312 A1 | 8/2013 | Sakai et al. | | |

FOREIGN PATENT DOCUMENTS

| | | |
|---|---|---|
| JP | H08-103027 | 4/1996 |
| JP | 2012-257407 | 12/2012 |
| JP | 2013-183634 | 9/2013 |

OTHER PUBLICATIONS

Japanese Office Action for 2015-103984 dated Sep. 4, 2018.

* cited by examiner

*Primary Examiner* — Robert Grant
(74) *Attorney, Agent, or Firm* — IPUSA, PLLC (57) ABSTRACT

A battery protection integrated circuit for protecting a secondary battery by controlling a charge or discharge operation of the secondary battery includes a power supply terminal connected to a positive electrode of the secondary battery; a ground terminal connected to a negative electrode of the secondary battery; an input terminal connected to a negative terminal coupled to ground of a load; a control terminal at which a control signal is input, wherein the control signal has a voltage level with reference to a potential at the negative terminal; a signal detection circuit configured to detect a relative voltage level of the control signal input at the control terminal with reference to a potential at the input terminal; and a control circuit configured to control open/close of a switching circuit connected to a charge or discharge path between the negative electrode and the negative terminal based on the control signal.

7 Claims, 4 Drawing Sheets

BATTERY PROTECTION INTEGRATED CIRCUIT, BATTERY PROTECTION APPARATUS AND BATTERY PACK

CROSS-REFERENCE TO RELATED APPLICATIONS

This patent application is based upon and claims the benefit of priority of Japanese Patent Application No. 2015-103984 filed on May 21, 2015, the entire contents of which are incorporated herein by reference.

BACKGROUND OF THE INVENTION

1. Field of the Invention

The present disclosure relates to battery protection integrated circuits, battery protection apparatuses and battery packs.

2. Description of the Related Art

Conventionally, an apparatus for protecting a secondary battery is known, in which a charge/discharge control switch, disposed between a negative electrode of the secondary battery and a negative terminal coupled to ground of a load, is turned off to protect the secondary battery (e.g., Patent Document 1). The apparatus includes an external signal detection circuit for detecting an external signal for turning on/off the charge/discharge control switch on the basis of a ground potential of the secondary battery.

However, a signal detection circuit in the conventional technology that detects the signal on the basis of the ground potential of the secondary battery may erroneously detect a control signal generated on the basis of a potential of the negative terminal coupled to the ground of the load due to a potential difference between the ground side potential of the load and the ground potential of the secondary battery.

RELATED ART DOCUMENT

Patent Document

[Patent Document 1]: Japanese Laid-open Patent Publication No. 2012-257407

SUMMARY OF THE INVENTION

An object of the present disclosure is to provide a battery protection integrated circuit in which erroneous detections of the control signal generated on the basis of a potential of the negative terminal coupled to the ground of the load can reduced.

According to one embodiment of the present invention, there is provided a battery protection integrated circuit for protecting a secondary battery by controlling a charge or discharge operation of the secondary battery, wherein the battery protection integrated circuit is powered by the secondary battery, the battery protection integrated circuit comprising: a power supply terminal connected to a positive electrode of the secondary battery; a ground terminal connected to a negative electrode of the secondary battery; an input terminal connected to a negative terminal that is coupled to ground of a load; a control terminal at which a control signal is input, wherein the control signal has a voltage level with reference to a potential at the negative terminal; a signal detection circuit configured to detect a relative voltage level of the control signal input at the control terminal with reference to a potential at the input terminal; and a control circuit configured to control a switching circuit that is connected to a charge or discharge path between the negative electrode and the negative terminal based on the control signal detected by the signal detection circuit.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

In the following, embodiments will be described with reference to accompanying drawings.

Figure 1:
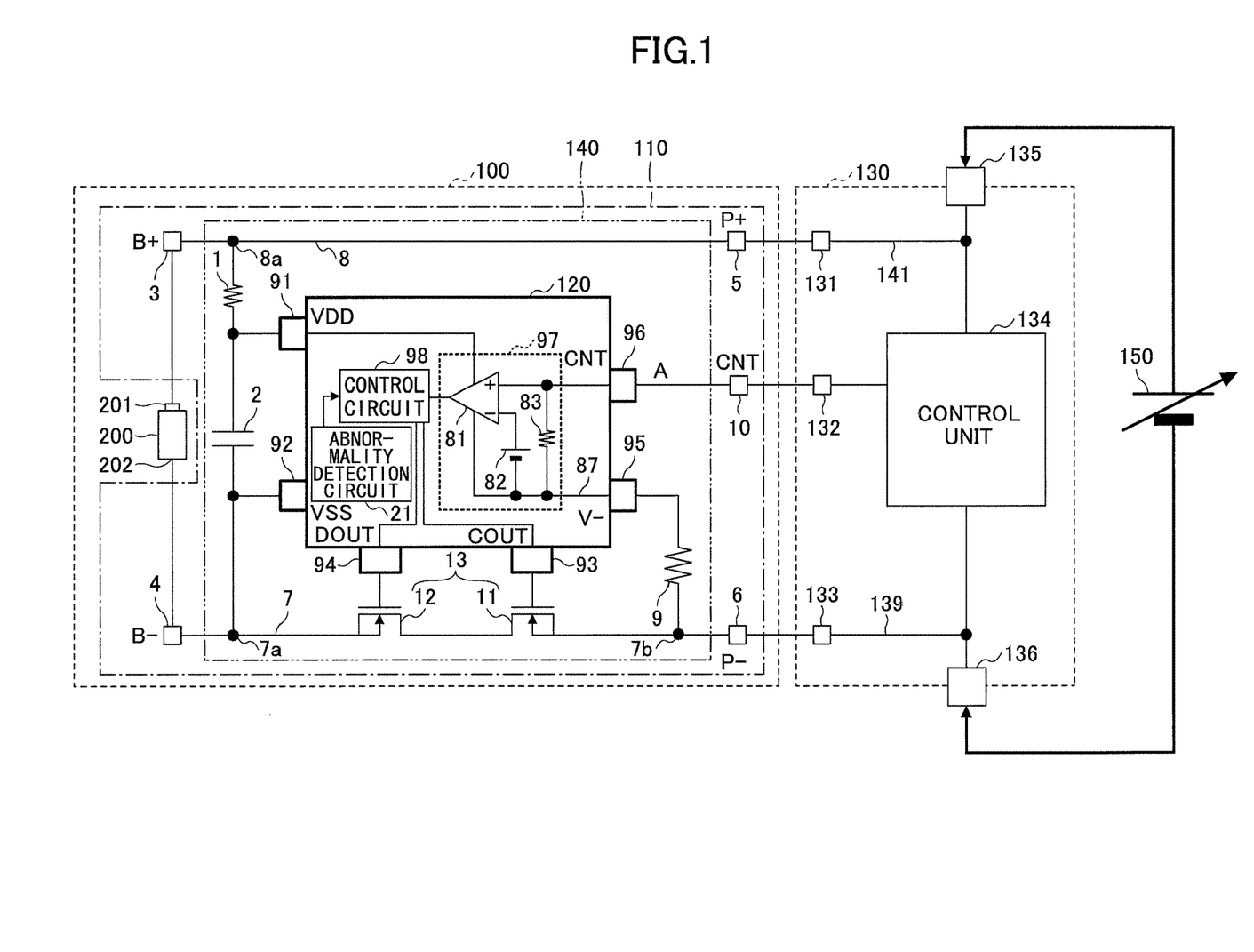
FIG. 1 is a diagram illustrating example configurations of a battery pack and an electronic apparatus connected to the battery pack.

FIG. 1 is a diagram illustrating example configurations of a battery pack 100 and an electronic apparatus 130. The battery pack 100 includes a secondary battery 200 capable of supplying electric power to the electronic apparatus 130 that is coupled to a positive terminal 5 and a negative terminal 6 and a battery protection apparatus 110 that protects the secondary battery 200. The battery pack 100 may be included in the electronic apparatus 130 or may be provided externally.

The electronic apparatus 130 is an example load powered by the secondary battery 200 of the battery pack 100. A mobile terminal apparatus can be exemplified as the electronic apparatus 130. A mobile phone, a smartphone, a tablet computer, a game device, a television, a music player, a movie player, a camera, etc., are examples of the mobile terminal apparatus.

A lithium ion battery, a lithium polymer battery, etc., are examples of the secondary battery 200.

The battery protection circuit 110 is an example battery protection apparatus that is powered by the secondary battery 200, and controls charge/discharge operation of the secondary battery 200 to protect the secondary battery 200 from overcurrent, and the like. The battery protection apparatus 110 includes a charge/discharge control circuit 140, a battery positive electrode connection terminal 3, a battery negative electrode connection terminal 4, a positive terminal 5, a negative terminal 6 and a control input terminal 10.

The charge/discharge control circuit 140 is an example of a charge/discharge control circuit for protecting the secondary battery 200 from overcurrent, etc., by controlling the charge/discharge operation of the secondary battery 200. The charge/discharge control circuit 140 includes a switching circuit 13, a battery protection integrated circuit 120, a resistor 1, a capacitor 2 and a resistor 9.

The battery positive electrode connection terminal 3 is a terminal coupled to a positive electrode 201 of the secondary battery 200. The battery negative electrode connection terminal 4 is a terminal coupled to a negative electrode 202 of the secondary battery 200. The positive terminal 5 is an example terminal coupled to an apparatus positive terminal 131 of the electronic apparatus 130, and coupled to an apparatus power supply path 141 of the electronic apparatus 130 via an apparatus positive terminal 131. The negative terminal 6 is an example terminal coupled to an apparatus negative terminal 133 of the electronic apparatus 130, and coupled to an apparatus ground 139 of the electronic apparatus 130 via an apparatus negative terminal 133. The control input terminal 10 is an example terminal coupled to a control output terminal 132 of the electronic apparatus 130, and coupled to a control unit 134 of the electronic apparatus 130 via the control output terminal 132.

The battery positive electrode connection terminal 3 and the positive terminal 5 are connected through a positive side power supply path 8. The battery negative electrode connection terminal 4 and the negative terminal 6 are connected through a negative side power supply path 7. The positive side power supply path 8 is an example charge/discharge path between the battery positive electrode connection terminal 3 and the positive terminal 5. The negative side power supply path 7 is an example charge/discharge path between the battery negative electrode connection terminal 4 and the negative terminal 6.

The battery protection apparatus 110 includes a switching circuit 13. The switching circuit 13 is connected in series in a negative side power supply path 7 between a first negative side connection point 7a and a second negative side connection point 7b. For example, the switching circuit 13 is a circuit in which a charge control transistor 11 and a discharge control transistor 12 are connected in series. When the charge control transistor 11 is turned off, the negative side power supply path 7, through which a charge current flows, is shut off, and the charge current flow to the secondary battery 200 is prevented. When the discharge control transistor 11 is turned off, the negative side power supply path 7, through which a discharge current flows, is shut off, and the discharge current flow from the secondary battery 200 is prevented.

For example, the charge control transistor 11 and the discharge control transistor 12 are respectively formed by MOSFET (Metal Oxide Semiconductor Field Effect Transistor). The charge control transistor 11 is disposed in the negative side power supply path 7 such that a forward direction of a parasitic diode in the charge control transistor 11 coincides with a discharge direction of the secondary battery 200. The discharge control transistor 12 is disposed in the negative side power supply path 7 such that a forward direction of a parasitic diode in the discharge control transistor 12 coincides with a charge direction of the secondary battery 200.

The battery protection apparatus 110 includes a battery protection integrated circuit 120. The battery protection integrated circuit 120 is an example battery protection integrated circuit powered by the secondary battery 200, and protects the secondary battery 200 from the overcurrent, etc., by controlling charge/discharge operation of the secondary battery 200. The battery protection integrated circuit 120 protects the secondary battery 200 while it is powered by the secondary battery 200.

For example, the battery protection integrated circuit 120 includes a power supply terminal 91, a ground terminal 92, a charge control terminal 93, the discharge control terminal 94, a input terminal 95 and a control terminal 96.

The power supply terminal 91 is a positive electrode side power supply terminal coupled to the positive electrode 201 of the secondary battery 200 via a positive side connection point 8a and the battery positive electrode connection terminal 3, and may be referred to as a VDD terminal. The power supply terminal 91 is connected to a connection point between one terminal of the resistor 1 and one terminal of the capacitor 2, where the other terminal of the resistor 1 is connected to the positive side power supply terminal 8 and the other terminal of the capacitor 2 is connected to the negative side power supply path 7. The other terminal of the capacitor 2 is connected to a first connection point 7a in the negative side power supply path 7 between the battery negative electrode connection terminal 4 and the discharge control transistor 12.

The ground terminal 92 is a negative electrode side power supply terminal coupled to the negative electrode 202 of the secondary battery 200 via a first negative side connection point 7a and the battery negative electrode connection terminal 4, and may be referred to as a VSS terminal. The ground terminal 92 is coupled to the negative side power supply path 7 at the first negative side connection point 7a and connected to a source of the discharge control transistor 12.

The charge control terminal 93 is a terminal for outputting a signal to prevent charging of the secondary battery 200, and may be referred to as COUT terminal. The charge control terminal 93 is connected to a control node (e.g., gate in case of MOSFET) of the charge control transistor 11.

The discharge control terminal 94 is a terminal for outputting a signal to prevent discharging of the secondary battery 200, and may be referred to as DOUT terminal. The discharge control terminal 94 is connected to a control node (e.g., gate in case of MOSFET) of the discharge control transistor 12.

The input terminal 95 is connected to the negative terminal 6 that is coupled to an apparatus ground 139 of the electronic apparatus 130, and may be referred to as V− terminal. The input terminal 95 is coupled to the negative side power supply path 7 between the negative terminal 6 and the charge control transistor 11 at a second negative side connection point 7b via a resistor 9. The input terminal 95 is connected to a source of the charge control transistor 11 via the resistor 9.

The control terminal 96 is terminal at which a control signal "A" generated on the basis of a potential at the negative terminal 6 is input via a control input terminal 10, and may be referred to as CNT terminal. The control input terminal 10 is connected with the control output terminal 132.

The battery protection integrated circuit 120 performs a protection operation of the secondary battery 200. The battery protection integrated circuit 120 includes an abnormality detection circuit 21 and a control circuit 98. The abnormality detection circuit 21 is an example detection unit for detecting abnormality of the current or voltage of the secondary battery 200. The control circuit 98 includes a switch control circuit (see FIG. 2) for controlling turning on/off of the charge control transistor 11 and discharge control transistor 12 in the switching circuit 13 based on the detection result of the abnormality detection circuit 21. For example, the switch control circuit 44 is formed as a logic circuit.

For example, the control circuit 98 performs an operation (overcharge protection operation) to protect against overcharging the secondary battery 200. For example, the abnormality detection circuit 21 monitors a battery voltage (cell voltage) of the secondary battery 200 by detecting a voltage between the power supply terminal 91 and the ground terminal 92. The abnormality detection circuit 21 outputs an overcharge detection signal when it detects the cell voltage greater than or equal to a predetermined overcharge detection voltage Vdet1 to determine that the secondary battery 200 is overcharged.

In response to accepting the overcharge detection signal, switch control circuit 44 waits until a predetermined overcharge detection delay time tVdet1 passes, and preforms performs an overcharge protection operation in which a control signal at the low level for turning off the charge control transistor 11 is output from the charge control terminal 93. Overcharging of the secondary battery 200 can be prevented regardless of the on/off state of the transistor 12 by turning off the transistor 11.

For example, the battery protection control circuit 98 preforms an operation (overcharge protection operation) to protect against overcharging the secondary battery 200. For example, the abnormality detection circuit 21 detects the voltage between the power supply terminal 91 and the ground terminal 92, thereby monitoring a battery voltage (cell voltage) of the secondary battery 200. The abnormality detection circuit 21 outputs an over discharge detection signal when it detects the cell voltage equal to or less than a predetermined over discharge detection voltage Vdet2 to determine that the secondary battery 200 is over-discharged.

In response to accepting the over discharge detection signal, switch control circuit 44 of the control circuit 98 waits until a predetermined over discharge detection delay time tVdet2 passes, and preforms an over discharge protection operation in which a control signal is at the low level for turning off the discharge control transistor 12 is output from the discharge control terminal 94. The secondary battery 200 can be prevented from being over discharged regardless of the on/off state of the transistor 11 by turning off the transistor 12.

For example, the battery protection control circuit 98 performs an operation (discharge overcurrent protection operation) to protect the secondary battery from the discharge overcurrent. For example, the abnormality detection circuit 21 monitors the voltage between the input terminal 95 and the ground terminal 92, thereby monitoring a voltage P− between the negative terminal 6 and the battery negative electrode connection terminal 4. The abnormality detection circuit 21 outputs a discharge overcurrent detection signal when it detects the voltage P− greater than or equal to a predetermined discharge overcurrent detection voltage Vdet3 to determine that the discharge overcurrent as an abnormal current flows through the negative terminal 6.

In response to accepting the discharge overcurrent detection signal, switch control circuit 44 waits until a predetermined discharge overcurrent detection delay time tVdet3 passes, and preforms a discharge overcurrent protection operation in which a control signal at the low level for turning off the transistor 12 is output from the discharge control terminal 94. The secondary battery 200 can be prevented from discharge overcurrent regardless of the on/off state of the transistor 11 by turning off the transistor 12.

Here, the voltage P− rises according to flow of discharge current for discharging the secondary battery 200 while at least the transistor 12 is turned on because the voltage is raised due to on-resistance of the transistor 12.

For example, the battery protection control circuit 98 performs an operation for protecting the secondary battery 200 from the charge overcurrent (i.e., charge overcurrent protection operation). For example, the abnormality detection circuit 21 monitors a voltage between the input terminal 95 and the ground terminal 92, thereby monitoring a voltage P− between the negative terminal 6 and the battery negative electrode connection terminal 4. The abnormality detection circuit 21 outputs a charge overcurrent detection signal when it detects the voltage P− equal to or less than a predetermined charge overcurrent detection voltage Vdet4 to determine that the charge overcurrent as an abnormal current flows through the negative terminal 6.

In response to accepting the charge overcurrent detection signal, the switch control circuit 44 waits until a predetermined charge overcurrent detection delay time tVdet4 passes, before performing a charge overcurrent protection operation in which a control signal at the low level for turning off the transistor 11 is output from the charge control terminal 93. Flowing charge overcurrent in the secondary battery 200 can be prevented regardless of the on/off state of the transistor 12 by turning off the transistor 11.

Here, the voltage P− is falls according to flow of charge current for charging the secondary battery 200 while at least the transistor 11 is turned on because the voltage falls due to on-resistance of the transistor 11.

The battery protection integrated circuit 120 includes a signal detection circuit 97. The signal detection circuit 97 is an example signal detection circuit for detecting a control signal A whose reference potential is a potential at the input terminal 95, where the control signal A is input from the control terminal 96 via the control input terminal 10. The control signal A is a signal having a voltage level with reference to the potential at the negative terminal 6, and provided from the control unit 134 of the electronic apparatus 130. The control unit 134 may be a microcomputer including a CPU, or may be a logic circuit.

Potentials at the negative terminal 6 and the apparatus ground 139 are approximately same. Therefore, when the control unit 134 outputs the control signal A generated on the basis of the potential at the apparatus ground 139 from the control output terminal 132, the control signal A on the basis of potential at the negative terminal 6 is input at the control terminal 96 via the control input terminal 10.

The signal detection circuit 97 detects the control signal A having a reference potential that is equal to the potential at the negative terminal 6 with reference to the potential at the input terminal 95 that is connected to the negative terminal 6. Thus, the signal detection circuit 97 can detect the control signal A on the basis of a potential approximately equal to the potential at the apparatus ground 139. Therefore, erroneous detections of the control signal A can be reduced even if the potentials at the apparatus ground 139 is different from that of the ground of the secondary battery 200. For example, the ground of the secondary battery 200 means to provide a current path between the negative electrode 202 and the discharge control transistor 12.

Also, a pull-down resistor 83 may be coupled to the control terminal 96 to prevent a high-impedance state at the control terminal 96 when the control terminal 96 is in an open state.

Here, assuming that the signal detection circuit 97 that detects the control signal A, which has a reference potential that is equal to the potential at the negative terminal 6 with reference to the potential at the ground terminal 92. In this case, a ground line 87 between the signal detection circuit 97 and the input terminal 95 does not exist, instead a ground line 86 exists between the signal detection circuit 97 and the ground terminal 92 (see FIG. 3). Here, because the pull-down resistor 83 is connected between the control terminal 96 and the ground terminal 92, unnecessary discharge current 137 of the secondary battery 200 may flow sequentially through a resistor 134b, a diode 134a, a control terminal 96, the pull-down resistor 83, the ground line 86, the ground terminal 92 and the negative electrode 202.

Figure 3:
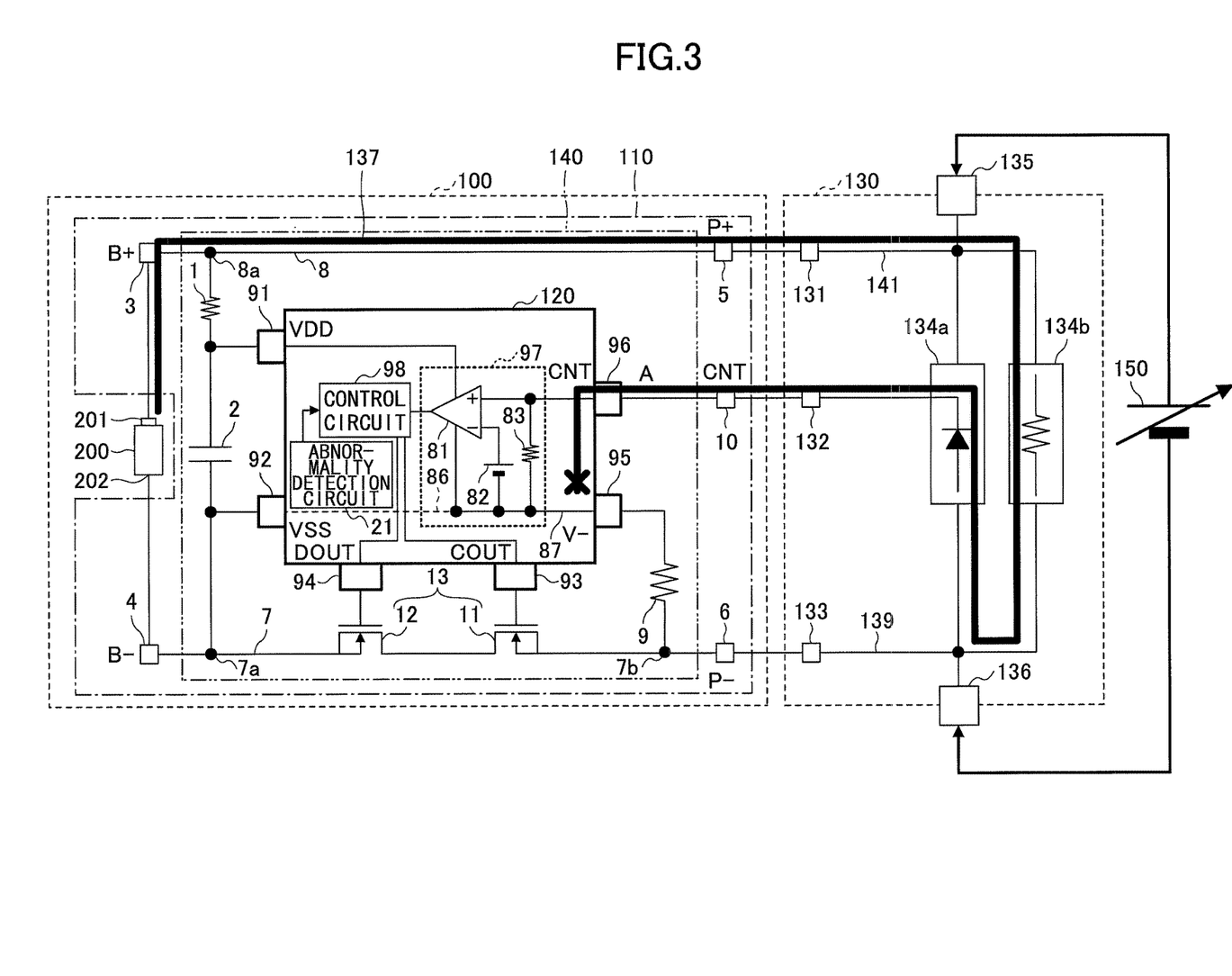
FIG. 3 is a diagram illustrating nonoccurrence of current loop.

The resistor 134b indicates e.g., a resistance between an apparatus power supply path 141 and the apparatus ground 139, and the diode 134a indicates e.g., a parasitic diode between the apparatus ground 139 and the control output terminal 132.

In contrast, as described in the present embodiment, in a case where the signal detection circuit 97 detects the control signal A having a reference potential that is equal to the potential at the negative terminal 6 on the basis of the potential at the input terminal 95, the ground line 86 does not exist while the ground line 87 exists. In this case, the pull-down resistor 83 is connected between the control terminal 96 and the input terminal 95. However, unnecessary discharge current 137 does not flow from the secondary battery 200 through the resistor 134b and the diode 134a of the electronic apparatus 130 even when the pull-down resistor 83 is disposed between the control terminal 96 and the input terminal 95.

For example, in FIG. 1, the control circuit 98 can control an output voltage between the positive terminal 5 and the negative terminal 6 by controlling a switching operation of the switching circuit 13 based on the control signal A detected by the signal detection circuit 97. The output voltage between the positive terminal 5 and the negative terminal 6 is a potential difference between the positive terminal 5 and the negative terminal 6, and corresponds to an output voltage of the battery pack 100.

For example, the control unit 134, being powered from an external power supply 150 via a pair of power supply terminals 135 and 136, outputs the control signal A at a high level to forcibly turn off the switching circuit. In this case, the control circuit 98 turns off the switching circuit 13 (that is, both the charge control transistor 11 and discharge control transistor 12 are turned off) during the control signal A being detected by the signal detection circuit 97.

When the switching circuit 13 is turned off, the potentials at the apparatus ground 139 and at the ground of the secondary battery 200 may not be the same. However, the signal detection circuit 97 of the present embodiment can detect the control signal A on the basis of the potential approximately equal to the potential at the apparatus ground 139. Therefore, erroneous detections of the control signal A can be reduced even when the potentials at the apparatus ground 139 differs from that of the ground of the secondary battery 200. Hence, the control circuit 98 can keep the switching circuit 13 to be turned off.

For example, the signal detection circuit 97 includes a comparator 81 for detecting the control signal A. The comparator 81 includes a non-inverted input terminal coupled to the control terminal 96 and an inverted input terminal at which a reference voltage 82 is provided. The reference voltage 82 is a voltage having a reference potential that is equal to the potential at the input terminal 95. The comparator 81 operates with a power supply voltage between the input terminal 95 and a power supply terminal 91. In a case where a voltage of the control signal A is greater than the reference voltage 82, the comparator 81 outputs a signal at a high level to the control circuit 98. In a case where a voltage of the control signal A is less than the reference voltage 82, the comparator 81 outputs a signal at the low level to the control circuit 98.

Figure 2:
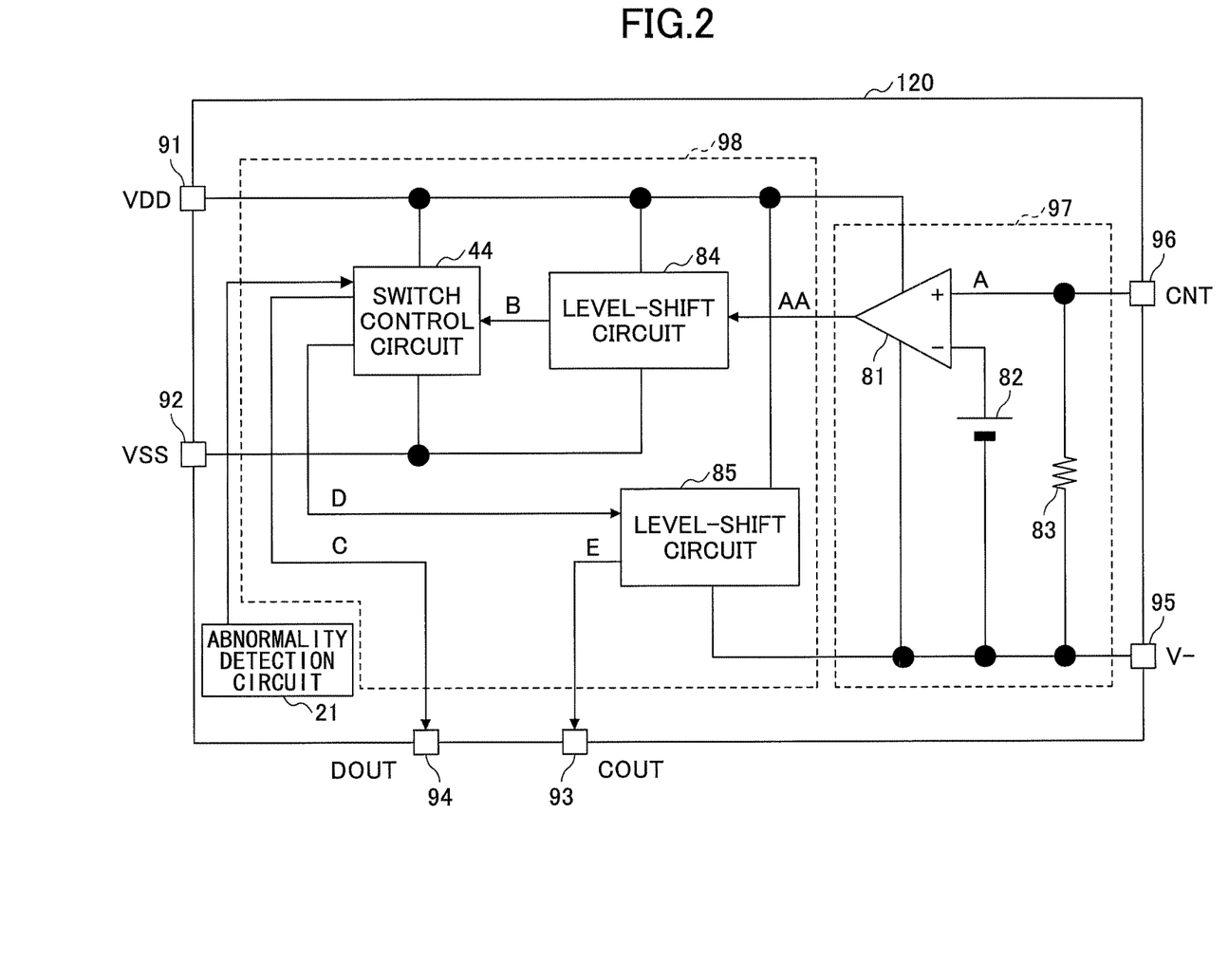
FIG. 2 is a diagram illustrating an example configuration of a battery protection integrated circuit.

As shown in FIG. 2, the control circuit 98 includes a first level-shift circuit 84, a switch control circuit 44 and a second level-shift circuit 85. In order to prevent erroneous operations of the switch control circuit 44 that operates with reference to the potential at the ground terminal 92 as the reference potential, the first level-shift circuit 84 converts the control signal A detected by the signal detection circuit 97 (that is, control signal AA output from signal detection circuit 97) into a second control signal B having a reference potential that is equal to the potential at the ground terminal 92. The switch control circuit 44 controls switching operations of the switching circuit 13 based on the second control signal B.

The switch control circuit 44 outputs a first switch control signal C for controlling discharge control transistor 12 based on the second control signal B. The discharge control transistor 12 is an example first switching element coupled to the negative electrode 202 of the secondary battery 200. The first switch control signal C is a signal having a reference potential that is equal to the potential at the ground terminal 92, and input at the gate of the discharge control transistor 12 via the discharge control terminal 94. The ground terminal 92 is coupled to the negative electrode 202 of the secondary battery 200 to which the source of the discharge control transistor 12 is connected. Therefore, erroneous operations of the discharge control transistor 12 can be prevented because the first switch control signal C is applied between the gate and the source of the discharge control transistor 12.

The switch control circuit 44 waits until the over discharge detection delay time tVdet2 or the discharge overcurrent detection delay time tVdet3 passes after the second control signal B is provided to the switch control circuit 44, and outputs the first switch control signal C. Thus, a delay is provided between the detection of the control signal A by the signal detection circuit and the turning off of the charge control transistor.

The switch control circuit 44 outputs a second switch control signal D for controlling the charge control transistor 11 based on the second control signal B. The charge control transistor 11 is an example second switching element coupled to the negative terminal 6. The second switch control signal D is a signal having a reference potential that is equal to the potential at the ground terminal 92, and is input to a second level-shift circuit 85.

The second level-shift circuit 85 converts the second switch control signal D into a third switch control signal E having a reference potential that is equal to the potential at the input terminal 95. The third switch control signal E is a signal for controlling the charge control transistor 11, which is provided at the gate of the charge control transistor 11 via the charge control terminal 93. The input terminal 95 is coupled to the negative terminal 6 to which the source of the charge control transistor 11 is connected. Therefore, erroneous operations of the charge control transistor 11 can be prevented, because the third switch control signal E is applied between the gate and the source of the charge control transistor 11.

The switch control circuit 44 waits until the overcharge detection delay time tVdet1 or the charge overcurrent detection delay time tVdet4 passes after the second control signal B is provided to the switch control circuit 44, and outputs the second switch control signal D. Thus, a delay is provided between the detection of the control signal A by the signal detection circuit and the turning off the charge control transistor.

Figure 4:
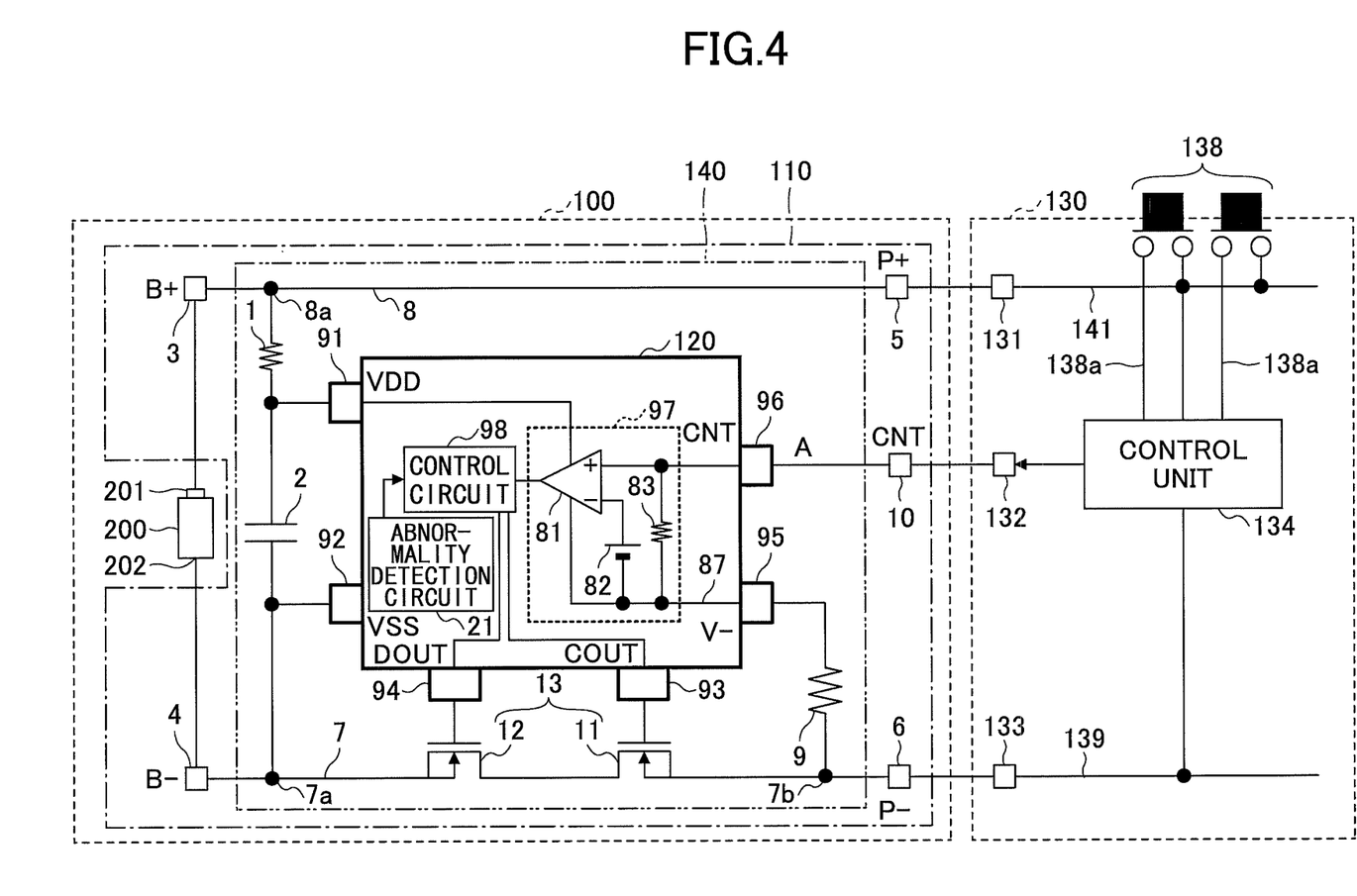
FIG. 4 is a diagram illustrating other example configurations of a battery pack and an electronic apparatus connected to the battery pack.

FIG. 4 is a diagram illustrating another example output method of the control signal A. The electronic apparatus 130 includes at least one or more buttons 138. The control unit 134 outputs the control signal A at high level while the button 138 is pushed, and it outputs the control signal A at low level while the button 138 is not pushed. For example, the control unit 134 detects that the button 138 is pushed while detecting short-circuiting between the push detection terminal 138a and the apparatus power supply path 141.

The control circuit 98 turns off the switching circuit 13 once the signal detection circuit 97 has detected the control signal A at a high level in excess of a predetermined delay time TD. Thus, the output of the battery pack 100 is shut off, and the electronic apparatus 130 is forced to be powered off. The delay time TD is a predetermined time set in the control circuit 98 in advance. A time from pushing the button 138 to turning off the power of the electronic apparatus 130 can be set by the delay time be TD.

When the electronic apparatus 130 is powered off, the output of control signal A is stopped (signal level of control signal A changes into low), and an operation mode of the control circuit 98 transitions to recovery mode.

As described above, according to the present embodiment, the control circuit 98 can electrically separate the secondary battery 200 from the electronic apparatus 130 through turn-off operation of the switching circuit 13 by providing the control signal A to the signal detection circuit 97. Thus, for example, an evaluation of the electronic apparatus 130 can be conducted without being affected by the output of the secondary battery 200 because the electronic apparatus 130 can be electrically separated from the secondary battery 200 even if they are physically connected. Also, by electrically disconnecting the electronic apparatus 130 from the secondary battery 200, the electronic apparatus 130 can be forcibly powered off in a case where the electronic apparatus 130 is uncontrollable.

Although the invention has been described with respect to example embodiments for a complete and clear disclosure, the appended claims are not to be limited to the described embodiments but are to be construed as embodying all modifications and alternative constructions that may occur to one skilled in the art that fairly fall within the basic teaching set forth herein.

What is claimed is:

1. A battery protection integrated circuit for protecting a secondary battery by controlling a charge or discharge operation of the secondary battery, wherein the battery protection integrated circuit is powered by the secondary battery, the battery protection integrated circuit comprising:
a power supply terminal connected to a positive electrode of the secondary battery;
a ground terminal connected to a negative electrode of the secondary battery;
an input terminal connected to a negative terminal that is coupled to a low potential side power terminal of a load;
a control terminal at which a control signal is input, wherein the control signal has a voltage level with reference to a potential at the negative terminal;
a signal detection circuit configured to detect a relative voltage level of the control signal input at the control terminal with reference to a potential at the input terminal; and a control circuit configured to control open/close of a switching circuit that is connected to a charge or discharge path between the negative electrode and the negative terminal based on the control signal detected by the signal detection circuit in a state that the switching circuit is off,
wherein the low potential side power terminal of the load is a ground terminal that has a potential different from the negative electrode of the secondary battery.

2. The battery protection integrated circuit according to claim 1, wherein the control circuit includes:
a level-shift circuit configured to convert the control signal detected by the signal detection circuit into a second control signal having a voltage level with reference to a potential at the ground terminal; and
a switch control circuit configured to control the switching circuit based on the second control signal; wherein
the switch control circuit preforms the control while a reference potential of the switch control circuit is set to be the potential at the ground terminal.

3. The battery protection integrated circuit according to claim 2, wherein
the switch circuit includes a first switching element connected to the negative electrode and a second switching element connected to the negative terminal, and
the switch control circuit outputs, based on the second control signal, a first switch control signal to control the first switching element and a second switch control signal to control the second switching element.

4. The battery protection integrated circuit according to claim 3, wherein
the control circuit includes a second level-shift circuit configured to convert the second switch control signal into a third switch control signal having a voltage level with reference to the potential at the input terminal, and
the second switching element is controlled based on the third switch control signal.

5. A battery protection apparatus for protecting a secondary battery by controlling a charge or discharge operation of the secondary battery, wherein the battery protection apparatus is powered by the secondary battery, the battery protection apparatus comprising:
a positive terminal connected to a positive electrode of the secondary battery;
a negative terminal connected to a low potential side power terminal of a load;
a control terminal at which a control signal is input, wherein the control signal has a voltage level with reference to a potential at the negative terminal;
a signal detection circuit configured to detect a relative voltage level of the control signal input at the control terminal with reference to a potential at the input terminal; and
a control circuit configured to control a voltage between the positive terminal and the negative terminal based on the control signal detected by the signal detection circuit in a state that a switching circuit that is connected to a charge or discharge path between a negative electrode of the secondary battery and the negative terminal is off,
wherein the low potential side power terminal of the load is a ground terminal that has a potential different from the negative electrode of the secondary battery.

6. A battery pack comprising:
a secondary battery;
a positive terminal connected to a positive electrode of the secondary battery;

a negative terminal connected to a low potential side power terminal of a load;

a control input terminal at which a control signal is input, wherein the control signal has a voltage level with reference to a potential at the negative terminal;

a charge or discharge control circuit configured to protect the secondary battery by controlling a charge or discharge operation of the secondary battery; wherein the charge or discharge control circuit includes;

a signal detection circuit configured to detect a relative voltage level of the control signal input at the control input terminal with reference to a potential at the negative terminal; and a control circuit configured to control a voltage between the positive terminal and the negative terminal based on the control signal detected by the signal detection circuit in a state that a switching circuit that is connected to a charge or discharge path between a negative electrode of the secondary battery and the negative terminal is off, wherein the low potential side power terminal of the load is a ground terminal that has a potential different from the negative electrode of the secondary battery.

7. The battery protection integrated circuit according to claim 1, wherein the control circuit is configured to send a high level control signal to the switch circuit to forcibly turn the switch circuit off when controlling the open/close of the switch circuit.

* * * * *